Figure 1:
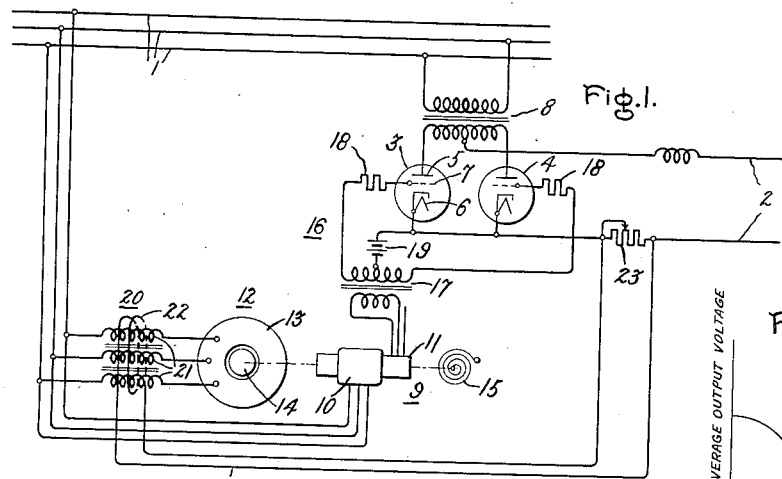

June 4, 1940.  F. A. HAIGH  2,203,527
ELECTRIC CONTROL SYSTEM
Filed Dec. 14, 1938

Inventor:
Frederick A. Haigh
by Harry E. Dunham
His Attorney.

Patented June 4, 1940

2,203,527

UNITED STATES PATENT OFFICE 2,203,527

ELECTRIC CONTROL SYSTEM

Frederick A. Haigh, Rugby, England, assignor to General Electric Company, a corporation of New York Application December 14, 1938, Serial No. 245,721
In Great Britain December 30, 1937

10 Claims. (Cl. 175—363)

My invention relates to electric control systems and more particularly to electric control systems which comprise a positionable element to control an operating condition or an electrical condition of electrical apparatus or an associated circuit.

Heretofore various means, such as electromagnetic relays or electromagnetic coils or torque motors, have been employed to control the operation of apparatus such as electrical apparatus, electric translating apparatus, electric valve translating apparatus, and the like. For example, heretofore, it has been proposed to employ direct current torque motors which move a positionable member to control an output characteristic or an operating condition of electrical apparatus. One objection to the use of a direct current torque motor is that the saturation of the motor causes smaller deflection per unit of change in the controlling influence within the upper ranges than within the lower regions of operation, thereby introducing non-linear effects which in many applications are highly undesirable. This objection is also present in other types of controlling devices of the electromagnetic type in which saturation comes into effect. In accordance with the teachings of my invention described hereinafter, I provide new and improved control systems which obviate the above disadvantage.

It is an object of my invention to provide new and improved control systems.

It is another object of my invention to provide new and improved control systems for electric translating apparatus.

It is a further object of my invention to provide new and improved control systems for electric valve translating apparatus.

In accordance with the illustrated embodiments of my invention, I provide new and improved electric control systems for electric translating apparatus, such as electric valve means, and comprising an alternating current torque motor which operates a positionable device such as a rotary phase shifter to control an operating condition of the electric valve means. In one embodiment of my invention, a saturable inductive device is connected between the torque motor and a source of constant alternating voltage to control the voltage impressed on the motor in accordance with the current conducted by the electric valve translating apparatus. The deflection of the torque motor is determined by the voltage impressed thereacross. In order to obtain a straight line load-voltage characteristic, it is necessary that the movement of the phase shifter should be such that the cosine of the angle of movement is a linear function of the load current of the rectifier. The average output voltage of an electric valve means of the controlled type, where a voltage of variable phase is impressed on the control member, is approximately proportional to the cosine of the angle of delay or retardation at which the electric valve means is rendered conductive. Consequently, the deflection of the torque motor must increase more rapidly than the load current over a range within which the straight line or linear relationship is required. The deflection of the alternating current motor is controlled by means of a saturable reactor in a manner to obtain a linear or straight line load-voltage characteristic.

In another embodiment of my invention, a saturable reactor is connected to the secondary winding of the torque motor to control the motor and to obtain a linear load-voltage characteristic. In a still further embodiment, a saturable reactor is connected in series relation with the primary winding of the torque motor and a variable resistance is connected in circuit with the secondary winding of the phase shifter. The saturable reactor and the resistance may be controlled simultaneously in response to the load to obtain a linear or a straight line load-voltage characteristic.

Figure 1A:
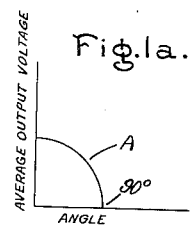
Figure 2:
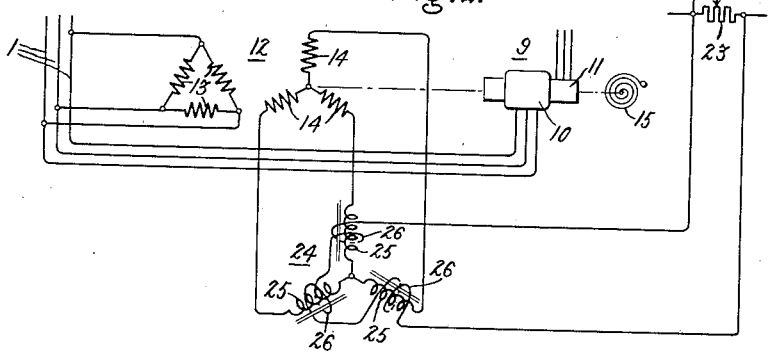
Figure 3:
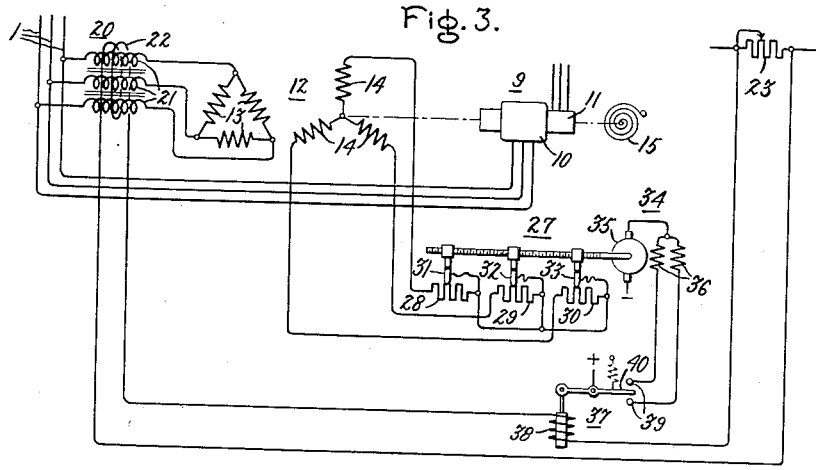

For a better understanding of my invention, reference may be had to the following figures taken in connection with the accompanying drawing, and its scope will be pointed out in the appended claims. Fig. 1 of the accompanying drawing diagrammatically illustrates an embodiment of my invention as applied to an electric control system for electric valve translating apparatus and Fig. 1a represents a characteristic to explain the operation thereof. Figs. 2 and 3 are modifications of the arrangement shown in Fig. 1.

In Fig. 1 my invention is diagrammatically illustrated as applied to an electric control system for controlling an operating condition or an output characteristic of electric apparatus. More specifically, the embodiment of my invention there illustrated is arranged for controlling the operation of electric valve translating apparatus for transmitting power between an alternating current circuit 1 of substantially constant voltage and a direct current circuit 2 through electric valve means 3 and 4 which are preferably of the type employing an ionizable medium, such as a gas or a vapor. Each of the electric valve means 3 and 4 may comprise an anode 5, a cathode 6 and a control member 7. A transformer 8 is connected between the alternating current circuit 1 and the electric valve means 3 and 4 and impresses on the anode-cathode circuits of these electric valves alternating voltages of proper phase displacement.

The electric translating apparatus may be controlled by means of a positionable device such as a rotary phase shifter 9 having a stator member or winding 10 and having a movable secondary member or winding 11. I provide an alternating current torque motor 12 having a stator winding 13 and a rotor member or winding 14 for positioning the member 11 of the rotary phase shifter 9 in accordance with a predetermined controlling influence, such as an output characteristic or an operating condition of the electric valve translating apparatus. The rotatable or positionable member 11 of the rotary phase shifter 9 may be mechanically coupled to the torque motor 12 and both movable members 11 and 14 of phase shifter 9 and torque motor 12 may be biased to a desired position by any suitable means such as a spring 15.

Alternating or periodic voltages of variable phase displacement relative to the voltages of the associated anode-cathode circuits are impressed on the control members 7 of electric valve means 3 and 4 by means of an excitation or control circuit 16 which comprises a transformer 17, current limiting resistances 18, and a source of negative unidirectional biasing potential such as a battery 19. The excitation circuit 16 may be energized from the winding 11 of the phase shifter 9 to impress on the control members 7 periodic voltages of adjustable or variable phase displacement.

In some applications, it is desirable to obtain a straight line load-voltage characteristic. In order to obtain such a characteristic, the movement of the rotary phase shifter should be such that the cosine of the angle of movement is a linear function of the load current transmitted by the electric valve means 3 and 4 which constitute a rectifier. Consequently, the deflection of the torque motor must increase more rapidly than the load current within the range of operation for which a straight line characteristic is required. When a direct current torque motor of normal construction is used, the deflection would increase at the same rate as the load current until saturation effects become appreciable, at which point the rate of increase of deflection would be reduced. In other words, a curve plotted with load current as abscissae and deflection as ordinates, would normally be concave downwards. However, because the output voltage characteristic of a rectifier of the controlled type varies as the cosine of the angular displacement, it is necessary that the curve be convex downwards.

I provide an arrangement which controls the positionable member of the rotary phase shifter 9 to obtain a linear or straight line load-voltage characteristic of the electric valve means 3 and 4. More specifically, I provide a suitable variable impedance means, such as a saturable inductive reactance 20, which controls the alternating current torque motor 12 so that the output voltage characteristic of the electric valve means 3 and 4 maintains a linear relation with respect to the load transmitted thereby. The saturable inductive reactance 20 may comprise a plurality of windings 21, the impedance of which is varied, and these windings may be connected in series relation with the stator winding 13 of the torque motor 12 and the alternating current circuit 1. As a means for controlling the effective impedance of the windings 21, I provide a control winding 22 which is energized in accordance with a predetermined controlling influence, such as the current transmitted by the electric valve means 3 and 4, to vary the voltage impressed upon the torque motor 12 so that as the load increases, the reactance decreases and the load-deflection curve is convex downwards from no-load to a point where the reactance becomes small. The variable energization of the control winding 22 of the saturable inductive reactance or reactor 20 may be derived from a shunt 23 which is connected in series relation with the load circuit 2. It is to be understood that the rotatable member 14 of the alternating current torque motor may be of the squirrel cage type or of the wound rotor type. Furthermore, it is to be understood that the alternating current torque motor 12 may be of the induction type or of the alternating current commutator motor type.

The operation of the embodiment of my invention shown in Fig. 1 will be explained by considering the system when it is operating to transmit power from the alternating current circuit 1 to the direct current circuit 2. The electric valve means 3 and 4 conduct current alternately to supply unidirectional current to circuit 2. It will be well understood by those skilled in the art that the average output voltage of the electric valve means 3 and 4 varies substantially as a cosine function of the angular displacement between the anode-cathode voltages and the periodic or alternating voltages impressed on the control members 7. This output characteristic is represented by curve A of Fig. 1a. If there is maintained a linear rate of change between the load transmitted and the displacement between the anode-cathode and control member voltages, it will be readily understood that the relation between the load and the voltage of the electric valves will be non-linear due to the cosine characteristic shown in Fig. 1a. Therefore, in order to obtain a linear or straight line characteristic between load and voltage, it is necessary to introduce into the control system a non-linear compensating factor. This compensating relationship is provided by the saturable reactor 20 which controls the voltage impressed upon the alternating current torque motor in order to vary the deflection of the torque motor at a greater rate than the load current over the desired range of operation.

The shunt 23 is initially adjusted so that the current supplied to the control winding 22 is not sufficient to cause saturation of the inductive reactance 20 at light load conditions. Consequently, upon increase of load transmitted by the electric valve means 3 and 4, the increase of current supplied to control winding 22 effects saturation of the reactance 20 and thereby reduces the effective impedance of the windings 21. As a result, the voltage impressed upon the torque motor 12 will be increased as the load increases and causes an increased rate of deflection of the torque motor, so that a linear relationship is maintained between load and voltage of the translating apparatus including electric valves 3 and 4. It will be understood that the system shown in Fig. 1 operates to maintain the voltage of circuit 2 substantially constant and also operates to maintain a linear rate of change between the load and the voltage of the translating apparatus.

Fig. 2 diagrammatically illustrates an embodiment of my invention which is a modification of the arrangement shown in Fig. 1. The elements shown in the arrangement of Fig. 2 are similar to many of the elements in Fig. 1, and these elements have been assigned corresponding reference numerals. In Fig. 2 the torque motor 12 is shown as being of the wound-rotor type having primary windings 13 and secondary windings 14. A saturable inductive device 24 is connected in circuit with the secondary windings 14 to control the torque-angle characteristic of the motor. The reactor 24 comprises windings 25, the impedance of which varies and also includes control windings 26 which control the state of magnetization of the reactor 24 and hence control the impedance of windings 25.

The embodiment of my invention shown in Fig. 2 operates in substantially the same way as that explained above in connection with Fig. 1. The torque-angle characteristic of the torque motor 12 is controlled by a saturable reactor 24 so that a linear relationship or linear rate of change may be obtained between the load and the voltage of the associated translating apparatus (not shown).

In Fig. 3 there is shown a still further embodiment of my invention which is similar in many respects to that shown in Fig. 1, and corresponding elements have been assigned like reference numerals. In addition to controlling the voltage impressed upon the primary windings 13 of the torque motor 12, I provide variable impedance means 27 which is connected in circuit with the secondary windings 14 of the torque motor. The variable impedance means 27 comprises a plurality of suitable variable impedances, such as variable resistances 28, 29 and 30 and associated movable contacts 31, 32 and 33, respectively. As a means for controlling the resultant impedance of the circuit for secondary windings 14, I employ any suitable arrangement, such as a reversible motor 34 having an armature 35 and a pair of field windings 36. The operation of the motor 34 and hence the positioning of the contacts 31—33 may be controlled by any suitable relay 37 having an actuating coil 38 and contacts 39 and 40. The system may be arranged so that the voltages impressed upon the stator winding 13 and the impedances of the rotor circuit are varied simultaneously to control the torque-angle characteristic of the motor 12. In this manner, a straight line or linear relation may be maintained between the load and the voltage of the electric valve apparatus.

The embodiment of my invention shown in Fig. 3 operates in substantially the same manner as that explained above in connection with Fig. 1. Of course, as the load varies, the relay 37 is actuated to control the impedance of the rotor circuit of the torque motor 12 and acts conjointly and simultaneously with the saturable reactor 20 to control the torque-angle characteristic of the motor 12. Of course, it is to be understood that the system of Fig. 3 may be operated by employing only the variable impedance means 27 connected in the rotor circuit of the torque motor 12. However, a more precise control may be effected by the conjoint operation of the variable impedance means 27 and the saturable reactor 20.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, a load circuit, electric translating apparatus connected between said circuits and comprising electric valve means of the type having a control member for controlling the conductivity thereof, a source of alternating current of substantially constant voltage, means for impressing on said control member an alternating voltage of variable phase displacement relative to the voltage of said alternating current circuit and comprising a phase shifting device having a movable member, an alternating current torque motor for positioning said member, and variable impedance means connected between said source and said torque motor for controlling the voltage impressed on said torque motor in accordance with a predetermined controlling influence.

2. In combination, an alternating current circuit, a load circuit, electric translating apparatus connected between said circuits and comprising electric valve means of the type having a control member for controlling the conductivity thereof, a source of alternating current of substantially constant voltage, means for impressing on said control member a periodic voltage of variable phase displacement relative to the voltage of said alternating current circuit and comprising a phase shifting device having a movable member, an alternating current torque motor of the induction type for positioning said member, and a saturable inductive device connected between said source and said torque motor for controlling the voltage impressed on said torque motor.

3. In combination, an alternating current circuit, a load circuit, electric translating apparatus connected between said circuits and comprising electric valve means of the type having a control member for controlling the conductivity thereof, a source of alternating current of substantially constant voltage, means for impressing on said control member a periodic voltage of variable phase displacement relative to the voltage of said alternating current circuit and comprising a phase shifting device having a movable member, an alternating current torque motor of the induction type for positioning said member and comprising a stator winding and a rotor winding, a saturable inductive device connected between said source and said stator winding, variable impedance means connected in the rotor winding circuit, and means for simultaneously controlling said saturable inductive device and said variable impedance means.

4. In combination, an alternating current circuit, a load circuit, electric translating apparatus connected between said circuits and comprising electric valve means of the type having a control member for controlling the conductivity thereof, a source of alternating current of substantially constant voltage, means for impressing on said control member a periodic voltage of variable phase displacement relative to the voltage of said alternating current circuit and comprising a phase shifting device having a movable member, an alternating current torque motor of the induction type for positioning said member and comprising a stator winding and a rotor winding, a saturable inductive device connected between said source and said stator winding, variable impedance means connected in the rotor winding circuit, and means for simultaneously controlling said saturable inductive device and said variable impedance means in accordance with a predetermined controlling influence.

5. In combination, an alternating current circuit, a direct current circuit, electric translating apparatus connected between said circuits and comprising electric valve means of the type having a control member for controlling the conductivity thereof, a source of current of substantially constant voltage, means for impressing on said control member an alternating voltage of variable phase displacement relative to the voltage of said alternating current circuit and comprising a phase shifter of the rotary type having relatively movable windings, an alternating current torque motor of the induction type mechanically coupled to said phase shifter for controlling the position of one of said windings, and variable impedance means connected between said source and said torque motor for controlling the voltage impressed on said torque motor in accordance with a predetermined controlling influence.

6. In combination, an alternating current circuit, a direct current circuit, electric translating apparatus connected between said circuits and comprising electric valve means of the type having a control member for controlling the conductivity thereof, a source of alternating current of substantially constant voltage, means for impressing on said control member an alternating voltage of variable phase displacement relative to the voltage of said alternating current circuit and comprising a phase shifter of the rotary type having relatively movable windings, an alternating current torque motor connected to be energized from said source, and a variable impedance means connected between said source and said torque motor for controlling the voltage impressed thereon in accordance with a predetermined electrical condition derived from one of said first mentioned circuits.

7. In combination an alternating current circuit, a direct current circuit, electric translating apparatus connected between said circuits and comprising electric valve means of the type having a control member for controlling the conductivity thereof, a source of alternating current of substantially constant voltage, means for impressing on said control member a periodic voltage of variable phase displacement relative to the voltage of said alternating current circuit and comprising a phase shifter of the rotary type having relatively movable windings, an alternating current torque motor connected to be energized from said source, and a variable impedance winding connected between said source and said torque motor and comprising a control winding responsive to a predetermined electrical condition for controlling the impedance of said variable impedance winding.

8. In combination, an alternating current circuit, a direct current circuit, electric translating apparatus connected between said circuits and comprising an electric valve means having a control member for controlling the conductivity thereof, means for impressing on said control member a periodic voltage variable in phase with respect to the voltage of said alternating current circuit and comprising a rotary phase shifter having relatively movable windings, means for positioning said rotary phase shifter and comprising an alternating current torque motor including a stator winding and a rotor winding, a source of alternating current of substantially constant value for energizing said stator winding, and a variable impedance means connected in circuit with said rotor winding to control the relative angular position of the windings of said phase shifter.

9. In combination, an alternating current circuit, a direct current circuit, electric translating apparatus connected between said circuits and comprising an electric valve means having a control member for controlling the conductivity thereof, means for impressing on said control member a periodic voltage variable in phase with respect to the voltage of said alternating current circuit and comprising a rotary phase shifter having relatively movable windings, means for positioning said rotary phase shifter and comprising an alternating current torque motor including a stator winding and a rotor winding, a source of alternating current of substantially constant value for energizing said stator winding, and variable impedance means connected in circuit with said rotor winding to control the relative angular positions of the windings of said phase shifter.

10. In combination, an alternating current circuit, a direct current circuit, electric translating apparatus connected between said circuits and comprising an electric valve means having a control member for controlling the conductivity thereof, means for impressing on said control member a periodic voltage variable in phase with respect to the voltage of said alternating current circuit and comprising a rotary phase shifter having relatively movable windings, means for positioning said rotary phase shifter and comprising an alternating current torque motor including a stator winding and a rotor winding, a source of alternating current of substantially constant value for energizing said stator winding, saturable inductive devices connected in circuit with said rotor winding, and means responsive to a predetermined controlling influence for controlling said saturable inductive devices to control the relative angular position of the windings of said phase shifter.

FREDERICK A. HAIGH.